United States Patent [19]

Kuhfus

[11] Patent Number: 4,672,666
[45] Date of Patent: Jun. 9, 1987

[54] TELEPHONE HANDSET FOR A TELEPHONE SET

[75] Inventor: Gerd Kuhfus, London, Canada

[73] Assignee: Northern Telecom, Limited, Montreal, Canada

[21] Appl. No.: 581,542

[22] Filed: Feb. 21, 1984

[51] Int. Cl.⁴ .............................................. H04M 1/03
[52] U.S. Cl. ...................................... 379/433; 379/428
[58] Field of Search ............ 179/178, 103, 179, 100 R

[56] References Cited

U.S. PATENT DOCUMENTS

| | | | |
|---|---|---|---|
| 3,400,226 | 9/1968 | Krumreich et al. | 179/103 X |
| 4,163,875 | 8/1979 | Cogan | 179/103 |
| 4,291,202 | 9/1981 | Adams et al. | 179/103 |
| 4,319,095 | 3/1982 | Cogan | 179/103 |
| 4,456,794 | 6/1984 | Strömer et al. | 179/103 |

FOREIGN PATENT DOCUMENTS 1180080 2/1970 United Kingdom ................ 179/179

Primary Examiner—Gene Z. Rubinson
Assistant Examiner—R. Vaas
Attorney, Agent, or Firm—Schwartz, Jeffery, Schwaab, Mack, Blumenthal & Evans

[57] ABSTRACT

A telephone hanset is made with two elongate molded parts, a back part and a front part. The back part is arcuate in side view and is substantially rigid. The front part has a substantially flat central portion which is flexible, with a housing at each end for the transmitter and receiver. The two parts are assembled by flexing the front part to conform to the back part, the two parts being connected together. This avoids the need for complex molds for molding the front part as no re-entrant walls occur for the housings.

10 Claims, 8 Drawing Figures

TELEPHONE HANDSET FOR A TELEPHONE SET

This invention relates to a handset, for a telephone set or other telecommunications terminal, and is particularly concerned with making the parts of a handset in a manner which avoids complex molds.

Conventionally a handset has an arcuate center portion which is grasped in the hand of the user, with an enlargement at each end projecting forwards. One enlargement is a housing containing the receiver and the other enlargement is a housing containing the transmitter. The forward faces are inclined at a small angle, the better to fit against the ear at one end and be adjacent the mouth at the other. This usually results in the housings or enlargements having a peripheral wall which is re-entrant where the wall extends to the center portion. This results in complex dies or molds, usually with cam pieces or collapsible members.

The present invention provides a simple solution. The handset is in the form of a housing having two main pieces, a back part and a front part. The front part carries the enlargements or housing at each end. The back part is substantially rigid and is formed with the desired arcuate shape. The front part is molded with the center portion straight but flexible—not arcuate, and then, when assembled to the back part is flexed into an arcuate shape. By this means, the front part can be molded in a simple die or mold. The handset is intended for automated assembly, and has the receiver at one end, the transmitter at the other end and wires extend along the center portion, soldered at each end to the transmitter and receiver. The parts can be assembled by engaging a hook member at one end of one part into an aperture or recess at the corresponding end of the other part. By flexing the front part outwards at the center, a hook member at the other end of one of the parts is engaged into a corresponding further aperture or recess. Alternatively the two parts can be assembled by flexing the front part to its arcuate form and the two parts snapped together.

The invention will be readily understood by the following description of one embodiment by way of example, in conjunction with the accompanying drawings, in which.

Figure 1:
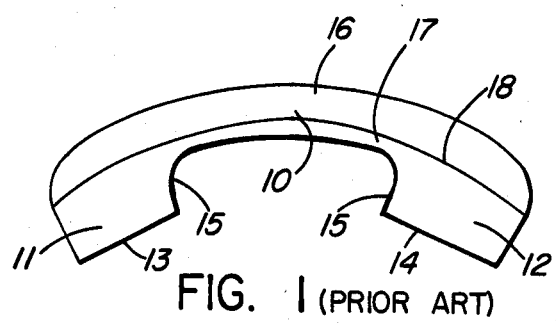
FIG. 1 is a side view of one form of conventional handset.

FIG. 1 illustrates one form of conventional handset having an arcuate center portion 10 with an enlargement or housing at each end, 11 and 12. The general shaping is for the handset to be curved, so that the faces 13 and 14 of the housings 11 and 12 are proximate to the ear and mouth of a user when the handset is in use. It will be seen that the peripheral walls of the housings are re-entrant, sloping forwardly and inwardly, where the walls meet the center portion. These positions are indicated generally at 15. The handset is generally divided into back and front parts, 16 and 17 respectively, for example along a line indicated at 18.

It will be appreciated that when the front part 17 is molded, the die is quite complex in that parts of the die have to move in order for the part to be removed. Such a die is expensive, requires maintenance and can cause problems in that markings may be formed on the molded part where there are joins in the die.

Figure 2:
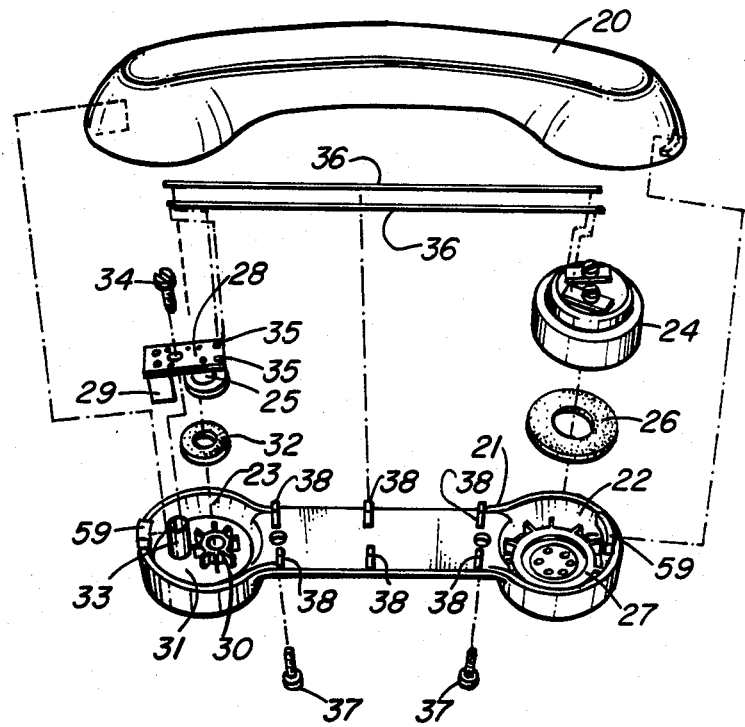
FIG. 2 is an exploded perspective view of a handset in accordance with the present invention.

FIG. 2 illustrates a telephone handset as made in accordance with the present invention. The handset comprises a back part 20 and a front part 21. The front part 21 has a hollow enlargement at each end, 22 and 23, forming housings for reception of a receiver 24 and transmitter 25 respectively. A foam resin or similar washer 26 rests on the front face 27 of housing 22, to provide an acoustic seal between the receiver 24 and the front face 27 of housing 22.

The transmitter in the example is mounted on a small printed circuit board 28, which also carries a modular jack 29. The transmitter rests on a hollow boss 30 formed on the front face 31 of housing 23, a foam resin or similar washer 32 being positioned between the transmitter and the boss. The printed circuit board rests on a pillar 33 and is held in place by a screw 34. The printed circuit board has two solder connection pads 35 at one end for solder attachment of leads 36 which connect to the receiver 24. The circuit pattern on the printed circuit board 28 connects the four terminals of the jack to the solder connection pads 35 and to soldered connections to the transmitter. In the example, two screws 37 attach the front part 21 to the back part 20, although a single screw, or more than two screws can be used if desired. Locating members 38 guide and locate the leads 36.

Figure 3:
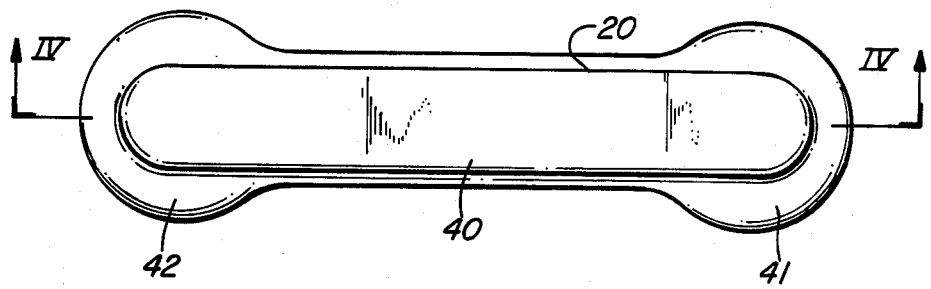
FIG. 3 is a plan view on the back of the back part of the handset in FIG. 1.
Figure 4:
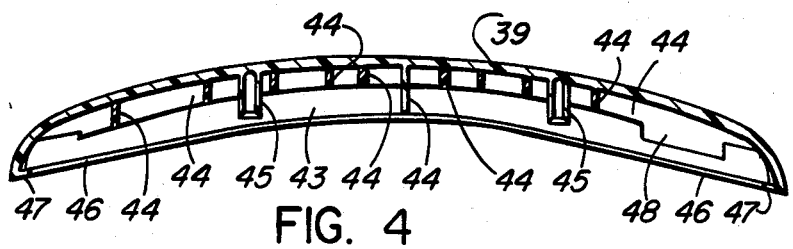
FIG. 4 is a cross-section on the line IV—IV of FIG. 3.
Figure 5:
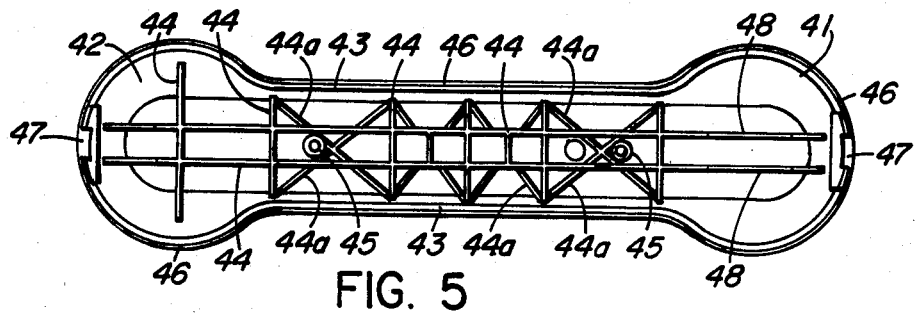
FIG. 5 is a plan view on the front of the back part of the handset in FIG. 1.

FIGS. 3, 4 and 5 illustrate the back part 20 in more detail. The back part is generally arcuate in side view, as seen by the cross-section in FIG. 4 having an open trough-like form, with a back wall 39. The center portion 40 is parallel in plan view, and at each end the top part is enlarged, having circular portions 41 and 42 which, as will be seen in respect to the front part described later, are shaped to cooperate with the enlargements or housings on the front part.

The back part is hollow and trough-like having a peripherally extending wall 43. A series of longitudinal and transverse ribs 44 and also, in the particular example, angled ribs 44a, provide, with the wall 43, and back wall 39, a high degree if stiffness. The back part is very resistant to bending about a transverse axis and also has considerable torsion stiffness. Two bosses 45 extend up from the interior surface of the center portion for reception of the screws 37 (FIG. 1) attaching the front part.

The peripheral wall 43 has a forwardly extending rib 46 extending around the periphery of the outer surface to provide a seating for a cooperative formation on the front part. At each end of the back part an inwardly extending rib 47 is formed at the edge of the wall. In the example, the ribs 47 are formed partly by material extending beyond the wall and partly by reducing the thickness of the wall at these positions. An extension is formed on each of the longitudinally extending ribs 44, formed within the enlargement 41, and indicated at 48. These extensions press down on the back of the receiver 24 (FIG. 1) and hold it firmly in position when the two parts of the handset are assembled. These could be at both ends and make the part symmetrical.

Figure 6:
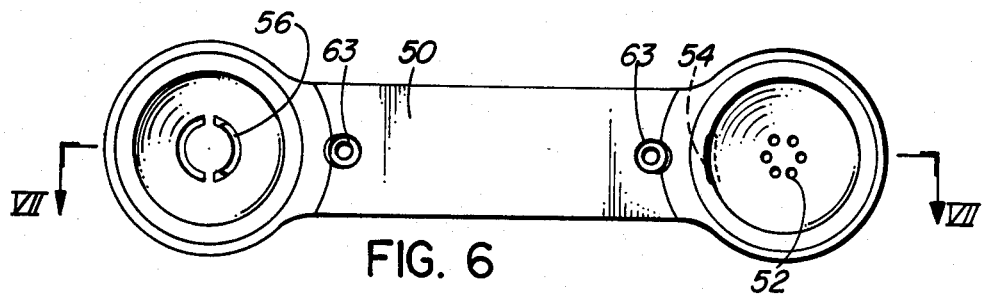
FIG. 6 is a plan view on the front of the front part of the handset in FIG. 1.
Figure 7:
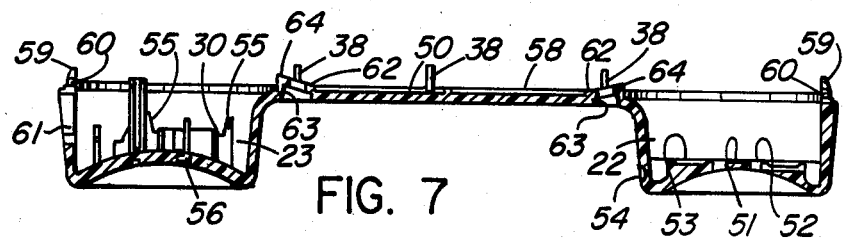
FIG. 7 is a cross-section on the line VII—VII of FIG. 6.
Figure 8:
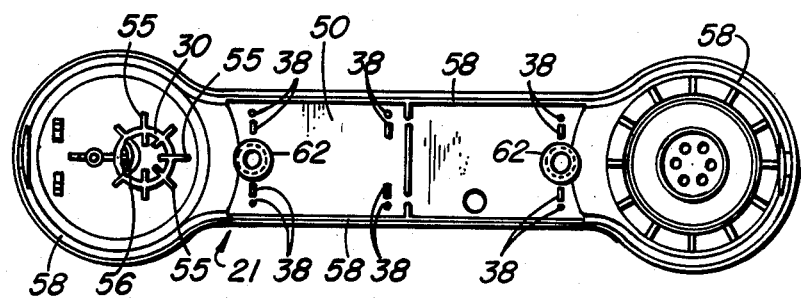
FIG. 8 is a plan view on the back of the front part of the handset in FIG. 1.

FIGS. 6, 7 and 8 illustrate the front member 21, in the form as it is molded. It comprises a flat center portion 50 having the two forwardly extending hollow enlargements or housings 22 and 23. The housings are cup-shaped, the housing 22, for the receiver having a flat inner bottom surface 51. Apertures 52 extend through the bottom of the housing to permit passage of sound from the receiver. An annular recess 53 provides a seating for the washer 26 (FIG. 1). On the side of the housing adjacent to the center portion 50, a small recess 54 is formed, in the example illustrated. However, this is an optional detail.

The housing 25 for the transmitter has the hollow boss 30 on which seats the transmitter. The washer 32 (FIG. 1) rests on top of the boss and the transmitter rests on the washer. Locating ribs 55 are provided for positioning the transmitter. A semi-circular slot 56 is formed in the bottom or inner surface 57. Pillar 33 extend up from the inner surface 57.

A narrow rib 58 extends around the periphery of the front part, on the rear surface. The rib is spaced inward slightly to fit inside the rib 46 on the back part. At each end of the front part is formed a projection 59 extending rearward from the edge. A slot 60 is formed through each projection 59. At the transmitter end, in the wall of the housing 23, is formed an aperture 61. This aperture is profiled to accept a modular plug which inserts into the modular jack 29 (FIG. 1). Two hollow bosses 62, one at each end of the central portion 50 permit passage of screws 37 (FIG. 1). The bores of the bosses are recessed at their outer ends, at 63 for the heads of the screws. The inner end surfaces 64 of the bosses 62 and the surfaces at the bottom or recesses 63 are inclined, for reasons as will be explained.

After assembly of receiver and transmitter to the front part, including the printed circuit board and modular jack, and the positioning and soldering in place the leads 36, the two parts of the handset are assembled. One way of doing this is by engaging a rib 47 at one end of the back part in the corresponding slot 60 at the end of the front part. This is done with the two parts inclined slightly, one relative to the other. The back part and front part are then pivotted together and by pushing the parts together, particularly at the center portions, the rib 47 at the other end of the back part will snap into the slot 60 at the other end of the front part. The inner surfaces of the ribs 47 and the outer surfaces of the projections 59 are chamfered to assist in the snapping together. The snapping together will result in some curving of the center portion 50 of the front part 21. This is because the overall length of the front part, on the joint surface or line, when in the as molded condition, is slightly longer than the overall length of the back part. This is to allow for curving of the front part. On insertion and tightening of the screws 37, the front part curves further at the center portion, until the two parts fit closely together with the ribs 46 and 58 in cooperative engagement. As the center portion curves or bends, so the surfaces 64 on the inner ends of the bosses 62 on the front part, and the bottom surfaces of the recesses 63, rotate and eventually the surfaces 64 abut the end surfaces of the bosses 45.

The back part is made to be a strong member with considerable stiffness. It is somewhat in the form of a relatively rigid beam with a high degree of torsional stiffness. Basically, the rigidity of the handset is obtained from the back part, although additional stiffness will be attained on assembly of the two parts together.

The particular form and arrangement of the ribs 44 in the back part can vary. Also the particular arrangement of the ribs 47 and slots 60 can be varied. The importance of the present invention is the ability to mold the front part in a flat configuration, avoiding complex die arrangements, and obtaining the curving of the front part, with the desirable inclination of the housings holding the transmitter and receiver by causing the center portion of the front part to be bent or deformed on assembly of the two parts. Thus two relatively simple moldings are required, with relatively simple dies. This results in a considerable saving in molding die costs, which in turn reduces the cost of the handset.

The form of the front part lends itself very easily to automated assembly of the transducers to the part, and automated soldering of the leads. This also reduces costs.

What is claimed is:
1. A telephone handset comprising two housing parts, a front part and a back part;
said front part comprising a substantially flat elongated flexible central portion and a forwardly extending hollow housing at each end of the central portion, each housing being defined by a tubular wall; a transmitter positioned in one of said hollow housings and a receiver positioned in the other of said hollow housings, said front part having a first joint surface;
said back part comprising an elongated hollow member having an arcuate back wall with a convex outer surface and a forwardly projecting peripheral wall extending around the periphery of the back wall; a plurality of ribs extending forward from said back wall within said peripheral wall, said back part forming a substantially rigid structure and having a second joint surface, said front part having an overall straight line length between the extremes of said first joint surface which is greater than an overall straight line length of said back part between the extremes of said second joint surface when said front part and said back part are separated and relaxed;
said central portion of said front part being flexed in the assembled condition to assume an arcuate form to conform to said back part, said tubular wall being inclined inwardly towards each other; and
means for retaining said front and back parts in an assembled condition.

2. A handset as claimed in claim 1, said means for retaining said front and back parts in an assembled condition comprising cooperative formations at each end of each of said front and back parts, and at least one screw passing through said front part into said back part.

3. A handset as claimed in claim 1, including a modular jack in said hollow housing containing said transmitter and an aperture in a wall of the housing aligned with said jack for insertion of a modular plug into said jack; and means electrically connecting said transmitter and said receiver to contact members in said jack.

4. A handset as claimed in claim 1, said plurality of ribs comprising ribs extending longitudinally along the back part, and a plurality of transversely extending ribs extending across the back part and interconnecting said peripheral wall and said ribs extending longitudinally.

5. A handset as claimed in claim 4, including further ribs extending obliquely to said transverse ribs and interconnecting said transverse ribs and said ribs extending longitudinally.

6. A handset as claimed in claim 2, said cooperative formations comprising; a project at each end of said front part, the projections extending from an end surface of the wall of each housing, each said projection having an outwardly facing inclined surface at its outer end and an aperture extending through said projection; and an inwardly extending rib at the edge of the peripheral wall at each end of said back part; said inwardly extending ribs snapping into said apertures in said projections on assembly of said front and back parts.

7. A handset as claimed in claim 2, said front part including two hollow bosses spaced apart along said central portion, and said at least one screw comprising two screws passing through said bosses into said back part; two hollow bosses spaced apart along said back, aligned with said hollow bosses in said front part, said two screws being received in said hollow bosses in said back part, said bosses having cooperating surfaces which are in contact when said front and back parts are assembled together.

8. A handset as claimed in claim 3, said transmitter being an electric transmitter, and in which said transmitter and said modular jack are mounted on a printed circuit board and including means in the hollow housing for receiving said transmitter for holding said printed circuit board, said modular jack and said transmitter in predetermined positions in the housing.

9. A handset as claimed in claim 1 where each of said housings has an axis, said axes being substantially parallel to one another when said front part and said back part are separated and relaxed, and said axes forming an acute angle when said front part and said back part are in said assembled condition.

10. A method of assembling a telephone handset, comprising:
    forming a front part with a substantially flat elongated flexible central portion and a forwardly extending hollow housing at each end of said central portion, such that said front part has a first joint surface;
    positioning a transmitter in one of said hollow housings and positioning a receiver in the other of said hollow housings;
    forming a back part as an elongated hollow member having an arcuate back wall with a convex outer surface and a forwardly projecting peripheral wall extending around the periphery of the back wall and such that said back part has a second joint surface, said front part being formed with an overall straight line length between the extremes of said first joint surface which is greater than the overall straight line length of said back part between the extremes of said second joint surface; and
    attaching said front part to said back part, said central portion of said front part being flexed to assume an arcuate form to conform to said back part when said front and back ports are attached.

* * * * *